United States Patent Office 3,564,817
Patented Feb. 23, 1971

3,564,817
PROCESS FOR SCRUBBING WASTE GASES
Earl Ocus Kleinfelder, Antioch, Calif., and Herbert Valdsaar, Wilmington, Del., assignors to E. I. du Pont de Nemours and Company, Wilmington, Del., a corporation of Delaware
No Drawing. Filed May 16, 1969, Ser. No. 825,392
Int. Cl. B01d 53/00
U.S. Cl. 55—71                                            3 Claims

ABSTRACT OF THE DISCLOSURE

A process for removing small amounts of titanium tetrachloride and other chloride impurities from waste gas produced during the chlorination of a titaniferous ore by first acid scrubbing the gas with sulfuric acid of 75 to 95 weight percent concentration and then scrubbing with water to produce a clear gas that may be vented to the atmosphere without fuming.

BACKGROUND OF THE INVENTION

In various stages of the production of titanium tetrachloride ($TiCl_4$), a waste gas is produced which contains small amounts of chloride contaminants. The waste gas cannot be discarded by conventional disposal techniques and cannot be purified by conventional processes inexpensively and effectively. The waste gas, which may be purge gas such as nitrogen ($N_2$), may be from a cylinder or may be the predominant gas remaining in the furnace gas. Disposal of the waste gas by simply venting to the atmosphere causes pollution by the fuming chlorides. Removal of the small quantity of chlorides is, accordingly, necessary prior to venting.

SUMMARY OF THE INVENTION

The present invention is a two step scrubbing process in which waste gases containing small amounts of chloride contaminants from 2 volume percent to trace amounts may be treated effectively. In the scrubbing process, the waste gases are scrubbed with concentrated sulfuric acid ($H_2SO_4$), then with water.

Sulfuric acid used in the first scrubbing stage must be within a narrow concentration range to effectively remove the contaminants. If the acid is below 75 weight $H_2SO_4$ the scrubber does not effectively remove all of the chloride contaminants. If the acid is more than 95 weight percent sulfuric acid (wt. percent $H_2SO_4$) the first stage scrubber is no longer effective after a short period of time. Accordingly, in the present invention, 75 to 95 weight percent $H_2SO_4$ is employed.

During operations, solids produced increase the acid viscosity. In this invention it is necessary to keep the acid mixture viscosity below 500 centipoises (cps.). Conveniently, this is done by continuously withdrawing part of the acid from the treating zone and adding new or make-up concentrated $H_2SO_4$.

Scrubbing the waste gas with the liquid acid phase in the first stage scrubber is accomplished by vigorously agitating the two phases together. The gas may be bubbled through the agitated liquid phase with the two phases combining as a foam or the liquid phase may be agitated in a chamber containing the waste gas with the liquid droplets passing through the gas as a mist.

In the second scrubber stage entrained acid in the gas, foam carried over from the acid scrubber and hydrochloric acid are scrubbed from the waste gas producing a non-fuming off-gas. The particular method of scrubbing the gas in the second stage is not critical as long as contact between the waste gas and liquid phase is sufficient to clean the gas of chlorides and acid carried over from the first stage. Water or any convenient cleaning medium that will effectively remove the chlorides and acid carried over may be used in the second stage scrubber.

As an example of applying the process, waste gas containing a small but objectionable amount of $TiCl_4$ and other chloride contaminants is gathered. The waste gas is mostly nitrogen loaded with about 1.3 volume percent chloride contaminants or approaching the chloride saturation point at 25° C. and one atmosphere. The waste gas is drawn through the gathering system and the two stage scrubbing system by eductors. Pumps, blowers or other means may be substituted for the eductors to propel the gas through the system.

The first scrubber can be a vessel large enough to contain the waste gas stream and a sufficient quantity of liquid acid solution and provide ample space for mixing the gas and liquid by agitation for the required residence time. For the illustrative example a stainless steel Chemineer, Inc. In-Line Agitator, Model IMA-20-12 with two 7 inch diameter impellers is used to scrub approximately 10 cubic feet per minute (c.f.m.) of waste gas with 93 weight percent $H_2SO_4$ at ambient conditions which are approximately 30° C. and one atmos. Fresh acid is added to the vessel at a rate sufficient to maintain the effluent liquid solution viscosity at about 150 centipoises (cps.) or lower, and in all events well below about 500 cps. The rate is about 23 pounds per hour (p.p.h.). Acid scrubbed waste gas separates from the foam at the top of the agitator and flows to the water scrubber while the liquid phase containing acid and contaminants overflows to be discarded.

The second stage scrubber is a water operated eductor which serves to both scrub and also draw the waste gas through the system. In the example the water scrubber is an S & K Figure 264 two inch eductor. Waste gas is cleaned by the water and separates from the water which contains the contaminants at the eductor discharge opening, to be vented as a clear off-gas. Water used in the second stage scrubber can be tap water. Any method for contacting the waste gas with the water in the second stage may be used, and the quantity of water used will vary with the method of contacting.

The following examples illustrate the discovery.

EXAMPLE I

Nitrogen containing about 1.3 vol. percent $TiCl_4$ is bubbled through 500 milliliters (ml.) of 93 weight percent $H_2SO_4$ in a mechanically agitated reaction vessel. The reaction vessel is a 320 Z Waring Blendor jar equipped with a 2-inch diameter, three blade, 12° downward pitch agitator revolving at 1700 r.p.m. The gas rate is 13.4 standard cubic feet per hour and the off-gas from the Blendor jar shows the first trace of contaminants after six hours and ten minutes as indicated when the off-gas first appears cloudy. Viscosity of the acid solution increased from 27.5 cps. to 137.5 cps. while the solution temperature increases from 24.3° C. to 25.5° C. The off-gas thus produced can then be passed through water to scrub it, and is finally vented to the atmosphere.

EXAMPLES II–VIII

The procedure including gas rate and initial gas viscosity as described in Example I above is repeated with various acid concentrations.

Sulfuric acid concentrations 50, 69, 71, 78, 93 and 97 weight percent is used and the data obtained demonstrate criticality of the acid concentration. With 97% acid, the off-gas produced fumes after but four and one-half hours of operation. At 17%, 64% and 50%, in runs of 15 minutes to 2 hours, dense white fumes occurred throughout. Using 78 to 93% acid, the off-gases were clear throughout for seven hours of running, and seemed to appear only after the acid viscosity got beyond 500 cps. Apparently the viscosity of the more concentrated sulfuric acid becomes too viscous more rapidly than with the preferred acid concentrations and the gas is no longer effectively contacted by the liquid phase. The viscosity limit for effective scrubbing is about 150 cps., but up to 500 cps. may be tolerable.

This process provides a simple, practical and effective process for removing small amounts of chloride contaminants from a waste gas. The liquid scrubbing agents for the two stage process are readily available and the process is not sensitive to the normal variations in the waste gas.

What is claimed is:

1. A method of scrubbing titanium tetrachloride containing inert gases to remove said chloride so that the remaining gases may be vented to the atmosphere without fuming comprising intimately contacting said gases containing small amounts of titanium tetrachloride with sulfuric acid of 75 to 95 weight percent concentration while vigorously agitating said acid, thereafter separating gases from said sulfuric acid, scrubbing the separated gases with water, and then venting the gas from said water scrubbing operation to the atmosphere.

2. A process according to claim 1 in which gases to be treated are continuously contacted with concentrated sulfuric acid in a contacting zone, and acid is continuously withdrawn therefrom while fresh concentrated sulfuric acid is supplied thereto, the rates of withdrawal and addition being adjusted to maintain the viscosity of the sulfuric acid mixture in the contacting zone below about 500 centipoises.

3. A process according to claim 1 which said gases are nitrogen containing from traces to two volume percent of titanium tetrachloride.

References Cited

UNITED STATES PATENTS

| 3,283,476 | 11/1966 | Honigh | 55—30 |
| 3,310,377 | 3/1967 | Stern et al. | 23—202 |
| 3,460,900 | 8/1969 | Moldovan et al. | 23—2 |

FOREIGN PATENTS

| 866,002 | 4/1961 | Great Britain | 55—71 |

SAMIH N. ZAHARNA, Primary Examiner

R. W. BURKS, Assistant Examiner